No. 821,379. PATENTED MAY 22, 1906.
W. M. ROCKWOOD.
PULLEY.
APPLICATION FILED FEB. 6, 1905.
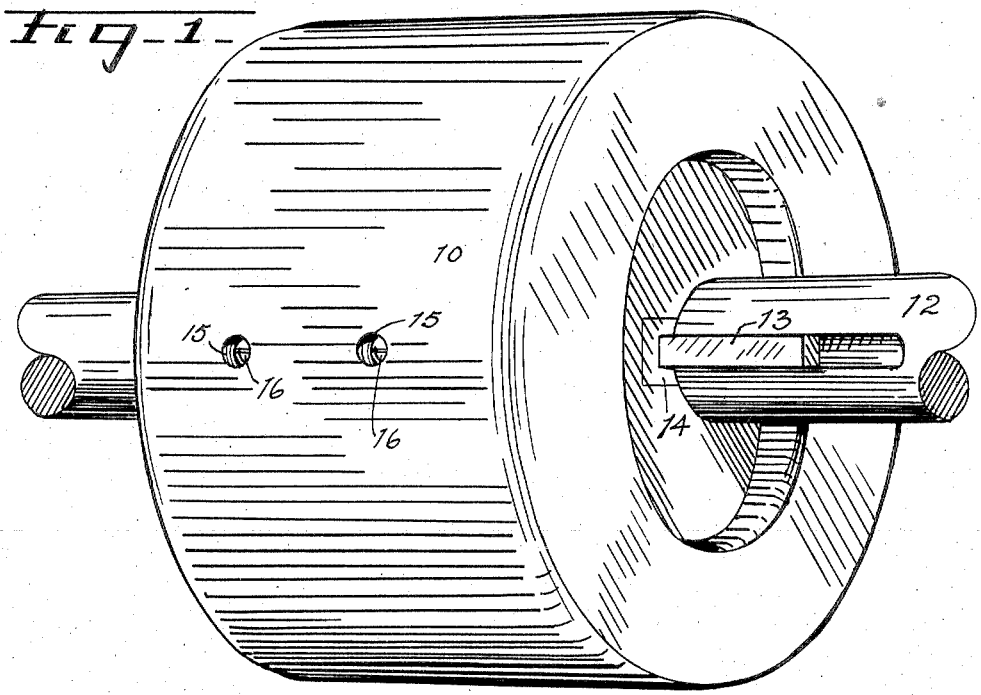
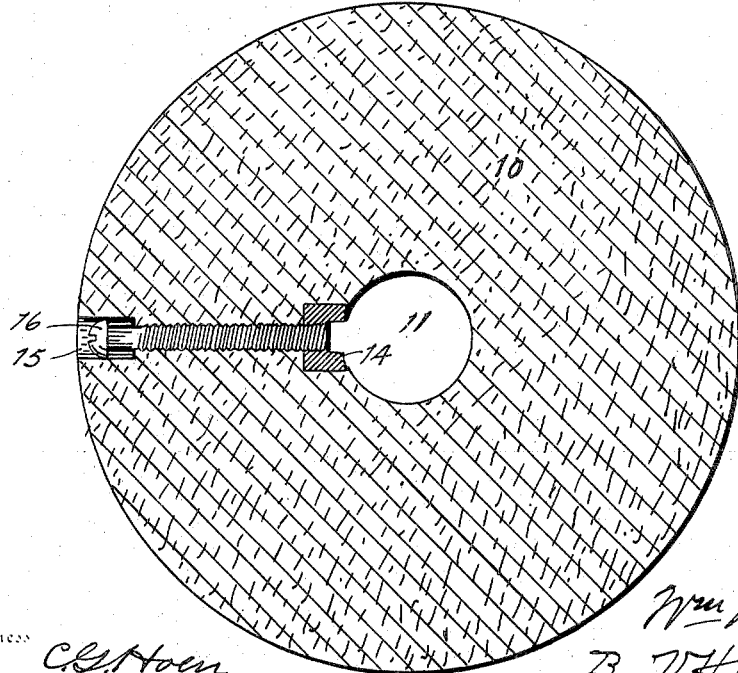

UNITED STATES PATENT OFFICE.

WILLIAM M. ROCKWOOD, OF INDIANAPOLIS, INDIANA.

PULLEY.

No. 821,379.

Specification of Letters Patent.

Patented May 22, 1906.

Application filed February 6, 1905. Serial No. 244,450.

*To all whom it may concern:*

Be it known that I, WILLIAM M. ROCKWOOD, of Indianapolis, county of Marion, and State of Indiana, have invented a certain new and useful Pulley; and I do hereby declare that the following is a full, clear, and exact description thereof, reference being had to the accompanying drawings, in which like letters refer to like parts.

The object of this invention is to provide improved means for mounting pulleys formed of wood, pulp, or other fibrous material upon shafts, so that such pulleys may be made stronger, cheaper, and simpler than heretofore. Such pulleys have been made with a metal core or hub for mounting the same upon a shaft. This hub or core is difficult and expensive to make, is heavy, and is surrounded by the body of the pulley, so the pulley from center to circumference is not made of a single homogeneous material. Hence it is not so strong or so cheap as a whole to manufacture as the improved pulley herein set forth.

The full nature of the invention will be understood from the accompanying drawings and the following description and claims.

In the drawings, Figure 1 is a perspective view of said pulley on a shaft, the latter being broken away. Fig. 2 is a transverse section of the pulley through one of the set-screws.

A solid cylindrical pulley 10 is made of wood, pulp, or other fibrous material, and afterward a central bore 11, as shown in Fig. 2, is bored of the desired diameter to fit properly on a shaft 12. The shaft has a spline 13 on it to cause the pulley to rotate with the shaft, but permit lateral adjustment of the pulley. A suitable recess is cut transversely of the pulley and adjacent the central bore 11 to receive tightly the metal recessed spline-bar 14. This bar envelops and fits upon the spline 13 on the shaft, so that said spline will not cut or wear the wood, pulp, or other fibrous material in the pulley.

The one or more threaded holes 15 are bored radially in the pulley from the periphery to the center through said spline-bar 14. In each hole a screw 16 fits, it being of such length as to bind the spline and the shaft when the pulley is mounted and not extend outside the periphery of the pulley. So its head is sunk somewhat and grooved, so the screw can be readily reached and actuated by a screw-driver. The threads in the spline-bar serve to hold the set-screws in binding engagement with the spline. The threads in the holes 15 serve chiefly to hold the screws in place disengaged from the spline-bar.

What I claim as my invention, and desire to secure by Letters Patent, is—

1. A pulley made of wood, pulp, or other fibrous material from center to circumference having a central bore to receive a shaft, a metal bar embedded along the bore of the pulley throughout its width, and a set-screw in a hole extending radially from the circumference through the pulley and said bar for securing the pulley on the shaft.

2. A pulley made of wood pulp or other fibrous material from center to circumference having a central bore to receive a shaft, a metal bar along the bore of the pulley throughout its width, and a plurality of set-screws in holes extending radially from the cricumference through the pulley and said bar for securing the pulley on the shaft.

3. A pulley made of wood, pulp, or other fibrous material having a central bore to receive a shaft, a set-screw in said pulley extending radially to the bore of the pulley, and metallic means embedded in said pulley at the bore throughout the width of the pulley and with a threaded hole through the same for the passage of said set-screw, said metallic means being recessed in its inner surface so as to fit over a spline or key on the shaft.

4. The combination with a shaft having a spline or key, of a pulley made of wood, pulp, or other fibrous material having a central bore for the shaft, a metal bar embedded along the bore of the pulley throughout its width and longitudinally recessed to fit over the spline or key in the shaft, and a plurality of set-screws extending radially through the pulley and said bar for securing the pulley on the shaft.

In witness whereof I have hereunto affixed my signature in the presence of the witnesses herein named.

WM. M. ROCKWOOD.

Witnseses:
V. H. LOCKWOOD,
N. ALLEMONG.